United States Patent [19]

Kubo

[11] Patent Number: 5,748,831
[45] Date of Patent: May 5, 1998

[54] IMAGE REPRODUCING APPARATUS

[75] Inventor: Ryoji Kubo, Tokyo, Japan

[73] Assignee: Canon Kabushiki Kaisha, Tokyo, Japan

[21] Appl. No.: 261,248

[22] Filed: Jun. 14, 1994

Related U.S. Application Data

[63] Continuation of Ser. No. 766,280, Sep. 27, 1991, abandoned.

[30] Foreign Application Priority Data

| Oct. 2, 1990 | [JP] | Japan | 2-264437 |
| Oct. 2, 1990 | [JP] | Japan | 2-264440 |
| Oct. 2, 1990 | [JP] | Japan | 2-264442 |

[51] Int. Cl.$^6$ ............................................... H04N 5/76
[52] U.S. Cl. ............................. 386/46; 386/121; 358/906
[58] Field of Search ....................... 358/335, 342, 358/906; 360/33.1, 35.1, 27, 14.1; 386/46, 121, 68, 80, 8, 125, 107; 348/730; H04N 5/76, 5/781

[56] References Cited

U.S. PATENT DOCUMENTS

| 4,717,968 | 1/1988 | Painton et al. | 358/342 |
| 4,858,028 | 8/1989 | Okino | 368/335 |
| 4,873,584 | 10/1989 | Hashimoto | 358/335 |
| 4,894,814 | 1/1990 | Yamada et al. | 358/342 |
| 4,959,735 | 9/1990 | Kawai | 358/342 |
| 5,057,925 | 10/1991 | Tsutsui et al. | 358/335 |
| 5,111,299 | 5/1992 | Aoki et al. | 358/335 |
| 5,134,497 | 7/1992 | Kim | 358/335 |

FOREIGN PATENT DOCUMENTS

| 0246542 | 11/1987 | European Pat. Off. . |
| 2637386 | 4/1990 | France . |
| 61-102883 | 5/1986 | Japan . |
| WO87 01856 | 3/1987 | WIPO . |

OTHER PUBLICATIONS

Patent Abstracts of Japan, Kokai No. 58-150168, vol. 7, No. 270, Dec. 1983.
Patent Abstracts of Japan, Kokai No. 61-082375, vol. 10, No. 256, Sep. 1986.
Patent Abstracts of Japan, Kokai No. 01-258262, vol. 14, No. 008, Jan. 1990.
Patent Abstracts of Japan, Kokai No. 61-085671, vol. 10, No. 260, Sep. 1986.
Patent Abstracts of Japan, Kokai No. 61-178755, vol. 11, No. 2, Jan. 1987.
Patent Abstracts of Japan, Kokai No. 62-043279, vol. 11, No. 227, Jul. 1987.
Patent Abstracts of Japan, Kokai No. 01-201851, vol. 13, No. 502, Nov. 1989.
Patent Abstracts of Japan, Kokai No. 01-321787, vol. 14, No. 130, Mar. 1990.
Patent Abstracts of Japan, Kokai No. 02-081303, vol. 14, No. 279, Jun. 1990.
Patent Abstracts of Japan, Kokai No. 02-140077, vol. 14, No. 383, Aug. 1990.

*Primary Examiner*—Thai Tran
*Assistant Examiner*—Huy Nguyen
*Attorney, Agent, or Firm*—Fitzpatrick, Cella, Harper & Scinto

[57] ABSTRACT

A reproducing apparatus includes a reproducing devices for reproducing information recorded on a medium, a supplying device for supplying power to the apparatus, and a controller for maintaining the power supply by the supplying device until completion of an interval reproducing of a series of information recorded on the medium by the reproducing device.

6 Claims, 13 Drawing Sheets

FIG. 5
(1) NORMAL TAKING MODE (NUMBER DENOTES TRACK)
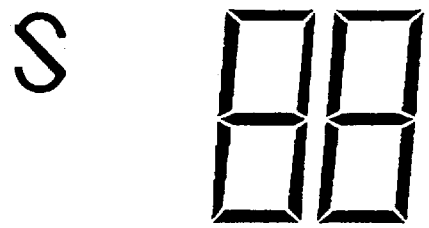
(2) CONTINUOUS TAKING MODE (NUMBER DENOTES TRACK)
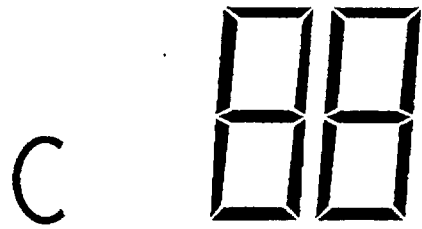
(3) SELFTIMER TAKING MODE (NUMBER DENOTES TRACK)

FIG. 6
(1) INTERVAL TAKING MODE
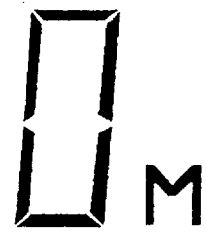
(2) DURING INTERVAL TAKING (NUMBER DENOTES TRACK)
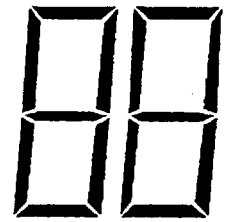
(3) INTERVAL TAKING PERIOD AT INTERVAL TAKING OPERATION
(NUMBERS 1~99 DENOTE INTERVAL TAKING PERIODS)
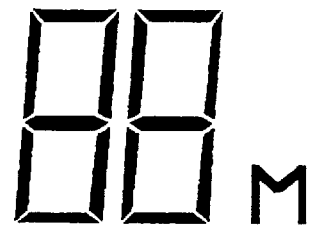

FIG. 7
(1) NORMAL REPRODUCING MODE
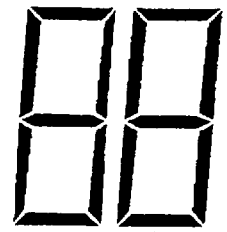
(2) INTERVAL REPRODUCING MODE
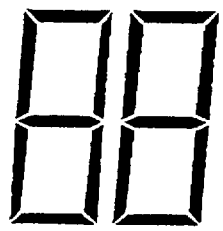
(3) ERASING MODE
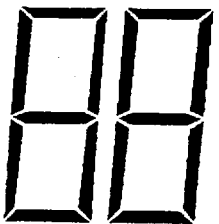
(4) ALL ERASING MODE
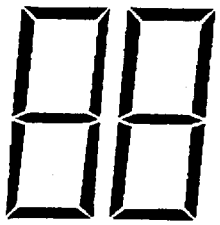

FIG. 8
(1)
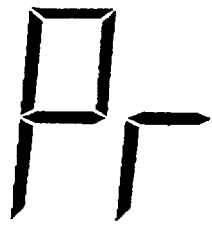
(2)
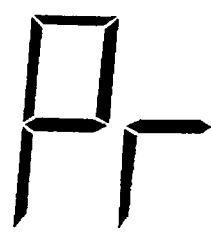
(3)
(4)

FIG. 9
(1) NUMBER DENOTES YEARS 0~99
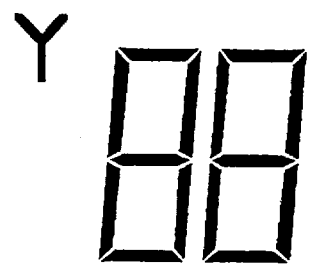
(2) NUMBER DENOTES DAYS 0~31
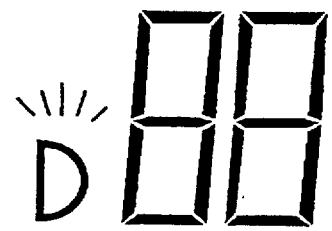

1

IMAGE REPRODUCING APPARATUS

This application is a continuation of application Ser. No. 07/766,280 filed Sep. 27, 1991, now abandoned.

BACKGROUND OF THE INVENTION

1. Field of the Invention

The present invention relates to an image reproducing apparatus, and more particularly to an image reproducing apparatus for reproducing an image from a recording medium such as a magnetic disk or a solid-state memory.

2. Related Background Art

There is already commercialized an electronic still camera employing a magnetic disk of 2 inches in diameter, called a still video floppy disk, as the image recording medium. The recording format of such a still video floppy disk is defined by the still video committee. The still video floppy disk has 50 tracks from the outermost 1st track to the innermost 50th one, each of which can record the image signal of a field. One frame of an image can be recorded on two adjacent tracks. A particular recording format is also defined for the ID information associated with the recorded still image, such as date, time, track number, field/frame identification information and user code.

There is also known an electronic still camera capable of digital recording of an image utilizing a solid-state memory, such as a semiconductor memory, as the recording medium.

Certain electronic still cameras are provided with an interval phototaking mode, for intermittently effecting the phototaking (recording) operation at a predetermined interval, and an interval reproducing mode, for intermittently reproducing the recorded images at a predetermined interval. In the conventional electronic still cameras, separate display devices are employed for indicating the interval phototaking mode and the interval reproducing mode.

Such video equipment, particularly a compact portable one, is generally provided with an automatic shut-off function, by which the power supply is automatically cut off or the equipment enters a stand-by state when the operation switches are not actuated for a predetermined period, called a shut-off time.

In the conventional image reproducing apparatus, however, since the shut-off time is determined independently from the interval reproducing function, the function of the apparatus is unvoluntarily shut off, for example in case of interval reproduction of a fully recorded floppy disk, before information of all the tracks can be reproduced.

Also the conventional image recording/reproducing apparatus is often provided with the interval reproducing mode for reproducing, in succession, the plural images recorded on the recording medium at a predetermined interval, and the start and stop of said mode is instructed by an exclusive switch. Presence of an such exclusive switch is an obstacle for reducing the size, for example, of the electronic still camera.

SUMMARY OF THE INVENTION

An object of the present invention is to provide an image reproducing apparatus capable of collectively or individually resolving the above-explained drawbacks.

Another object of the present invention is to provide an image reproducing apparatus capable of realizing various functions with a simple structure.

Still another object of the present invention is to provide an image reproducing apparatus capable of securely effecting interval image reproduction.

Still another object of the present invention is to provide an image reproducing apparatus capable of controlling the interval image reproduction with a simple structure.

The foregoing objects can be attained, according to a preferred embodiment of the present invention, by an image reproducing apparatus having an interval reproduction mode for reproducing plural images recorded on a recording medium at a predetermined interval, comprising control means for suspending the shut-off of functions during the interval reproduction of at least a series of said plural images, thereby preventing the shut-off of operations in the course of the interval reproducing operation.

Still another object of the present invention is to provide an image reproducing apparatus provided with novel functions.

Still other objects of the present invention, and the advantages thereof, will become fully apparent from the following description of embodiments, which is to be taken in conjunction with the attached drawings.

According to the embodiment explained above, a common display device is used for the interval recording mode and the interval reproducing mode, so that the space, wirings, driving circuits, etc. for the display device can be reduced and the entire equipment can be made compact.

Also said embodiment avoids the shut-off of operations in the course of an interval reproducing operation.

Furthermore, in said embodiment, the start and/or end of the interval reproducing operation is instructed by an operation member which is primarily used in the recording mode, so that an exclusive switch for such start and/or stop may be dispensed with, and a cost reduction and size reduction are accordingly rendered possible.

BRIEF DESCRIPTION OF THE DRAWINGS

FIGS. 5, 6, 7, 8 and 9 are views showing examples of a display by the display unit 36;

DETAILED DESCRIPTION OF THE PREFERRED EMBODIMENTS

Now the present invention will be discussed in detail by embodiments shown in the attached drawings.

Figure 1:
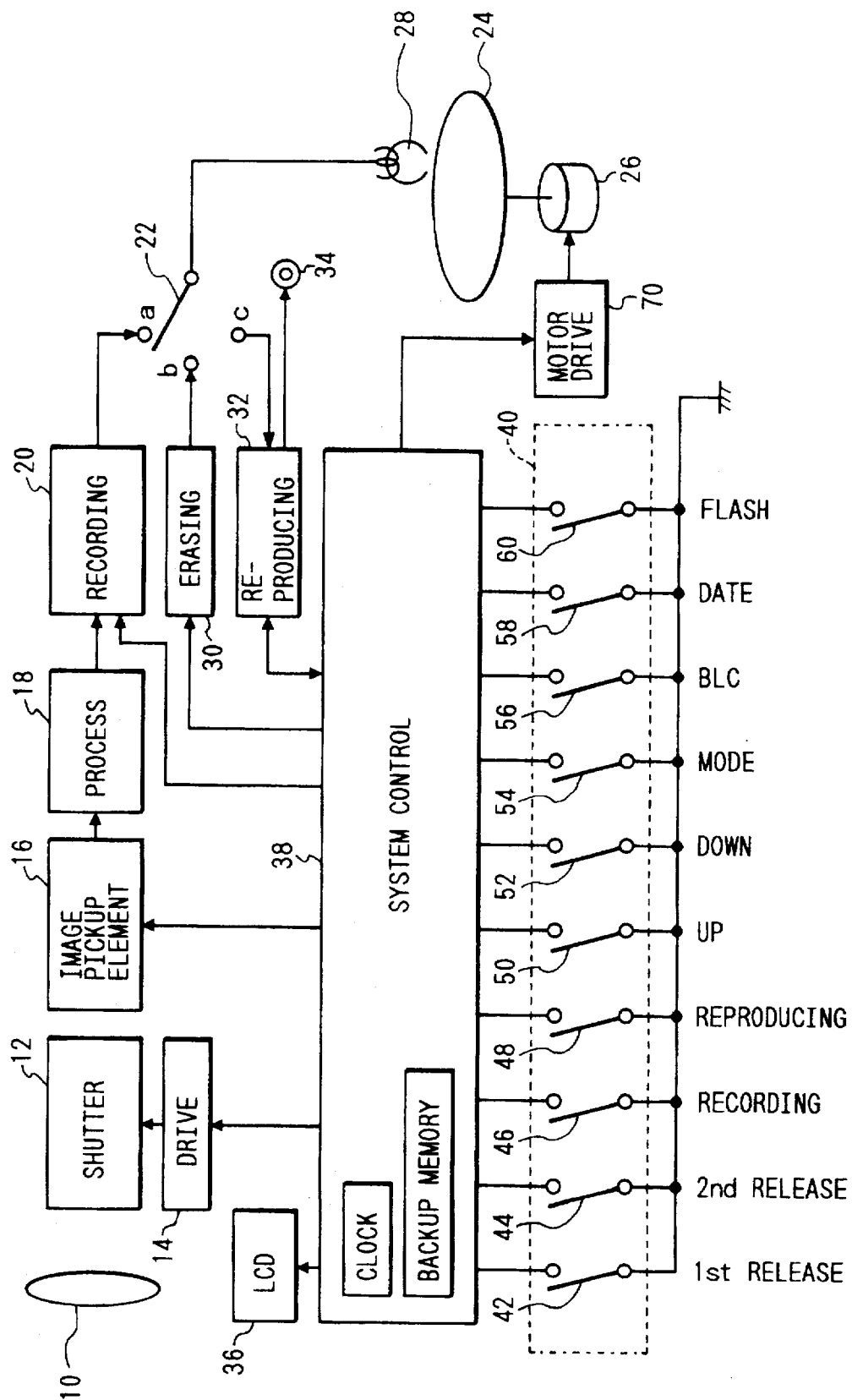
FIG. 1 is a block diagram of an embodiment of the present invention.

FIG. 1 is a block diagram of an embodiment of the present invention, wherein shown are a phototaking lens 10; a mechanical shutter 12; a driving circuit 14 for said shutter 12; an image pickup device 16; a process circuit 18 for forming a luminance signal and color difference signals from the output of said image pickup device 16; a recording circuit 20 for applying recording processes such as modulation on the luminance and color difference signals released from the process circuit 18; a selector switch 22 for selecting recording, erasure or reproduction; a video floppy disk 24 constituting the recording medium; a motor 26 for rotating said floppy disk 24; a magnetic head 28; an erasing circuit 30 for generating an erasing signal; a reproducing circuit 32 for applying a reproduction process such as demodulation on the signal reproduced by the magnetic head 28 thereby generating a video signal; and a video output terminal 34.

There are further shown a liquid crystal display device 36 for displaying the status of the system and various data; a system control circuit 38 for controlling the entire system; and a group of switches 40 for entering instructions to said control circuit 38. In said group there are provided a first release switch 42 to be closed by a first stroke of the shutter releasing operation, thereby initiating preparation for phototaking; a second release switch 44 to be closed by a second stroke, succeeding said first stroke, of the shutter releasing operation, thereby initiating the phototaking operation; a recording switch 46; a reproducing switch 48; an up switch 50 for instructing a track upshift; a down switch 52 for instructing a track downshift; a mode switch 54 for switching the display mode of the display unit 36 and the set mode; a BLC switch 56 for back lighting correction; a date switch 58; and a flash switch 60 for controlling a flash unit. The detailed functions and additional functions of said switches will be explained later.

A motor driving circuit 70, for driving the motor 26, stops said motor 26 in the shut-off state.

The system control circuit 38 is provided therein with a clock circuit and a back-up memory, and there are also provided a battery for said back-up memory, and a main battery for powering various circuits other than the control circuit 38.

Figure 11:
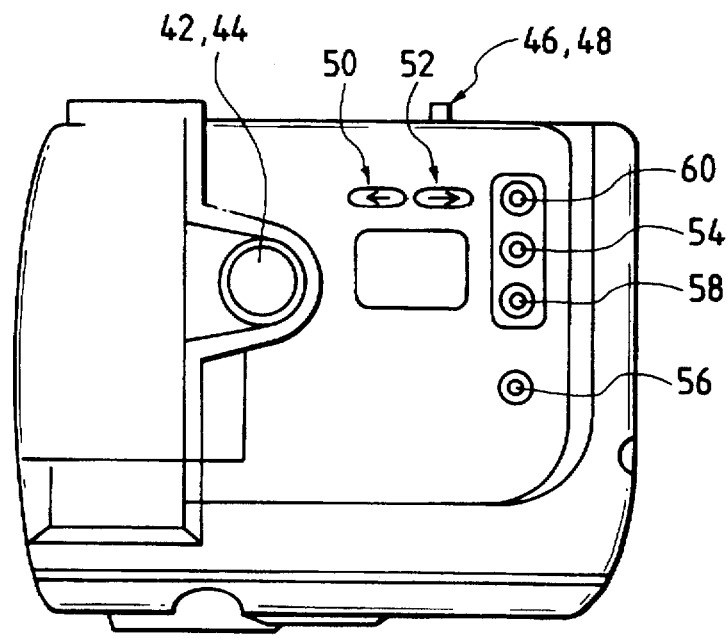
FIG. 11 is an external view of the apparatus.

FIG. 11 is an external view of the apparatus of said embodiment, wherein like numbers correspond to those in FIG. 1.

Figure 2:
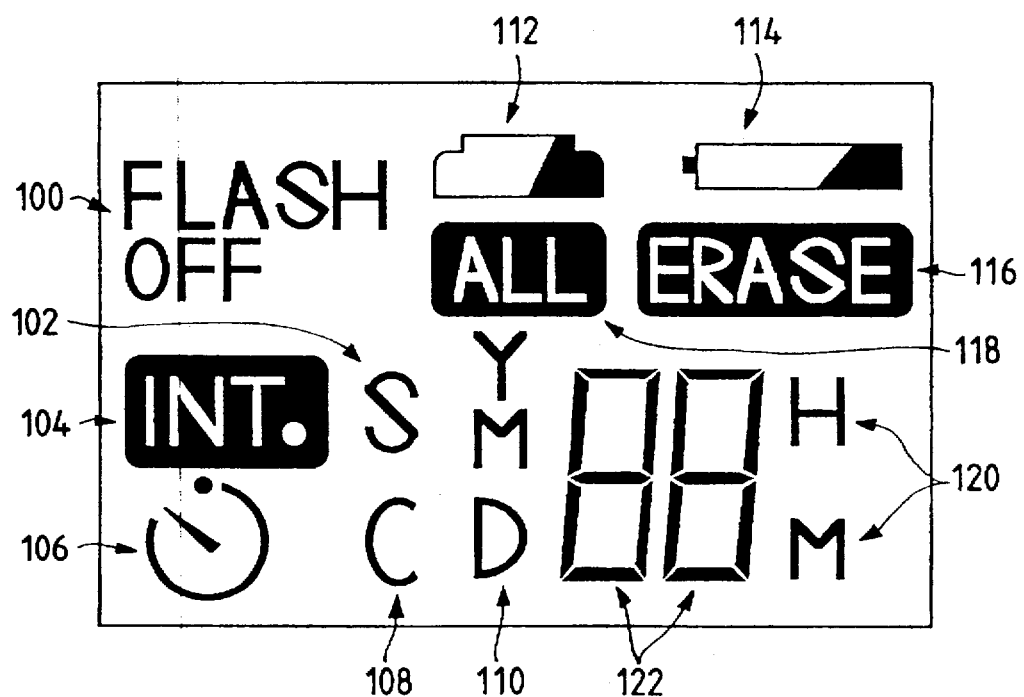
FIG. 2 is a view showing the contents of a display of a display unit 36.

FIG. 2 shows display elements in the liquid crystal display unit 36. An element 100 is displayed when the light emission of the flash unit is forcibly inhibited, and is turned off when the light emission is automatically controlled according to the intensity of external illumination. An element 102 is displayed in the normal phototaking mode. An element 104 is displayed in the interval phototaking mode or in the interval reproduction mode. An element 106 is displayed in the self-timer phototaking mode. An element 108 is displayed in the continuous phototaking mode. Elements 110 are displayed for distinguishing date, wherein Y, M and D respectively stand for year, month and day. An element 112 flashes when the battery for the clock needs replacement. An element 114 flashes when the main battery needs replacement. An element 116 is displayed in the erasing mode. An element 118 is displayed together with the element 116 in the all-track erasing mode. Elements 120 are displayed for distinguishing time, wherein H and M respectively stand for hour and minute. Elements 122 display characters and numerals, for example, for date, time or track number.

The circuit shown in FIG. 1 functions in the following manner. In the recording operation, the shutter 12 is activated by the shutter releasing operation, and the electrical signal obtained by the image pickup device 16 is converted by the process circuit 18 into luminance and color difference signals. The recording circuit 20 applies a recording process such as frequency modulation on the output signals of the process circuit 18, and the obtained signal is supplied through the switch 22 to the magnetic head 28 and recorded on the magnetic disk 24. In the reproducing operation, the output of the magnetic head 28 is supplied through the switch 22 to the reproduction circuit 32, which effects a reproduction process such as demodulation and releases the reproduced image signal to the output terminal 34.

Figure 3A:
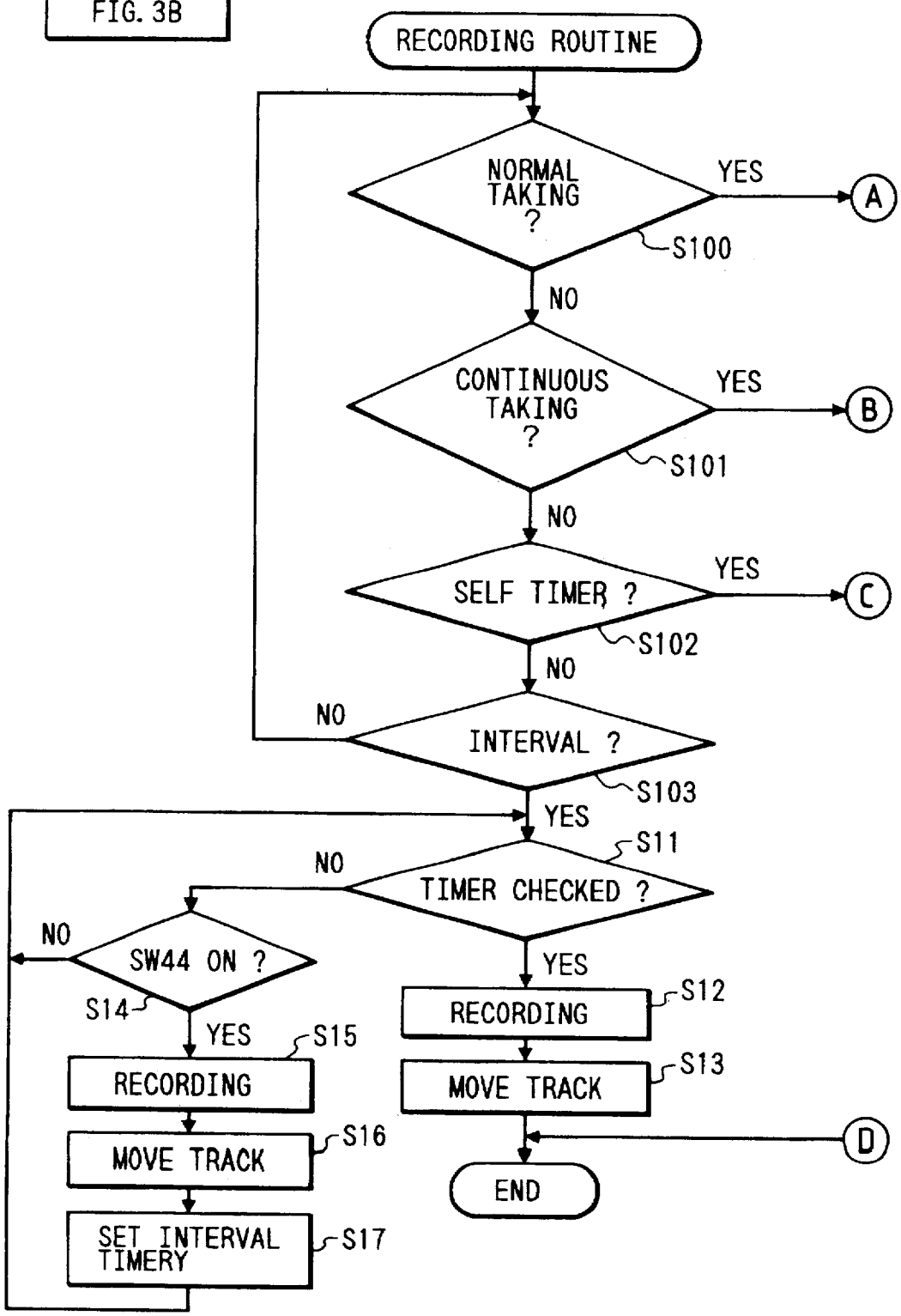
FIG. 3 is a flow chart of an operation sequence for recording and display.
Figure 3B:
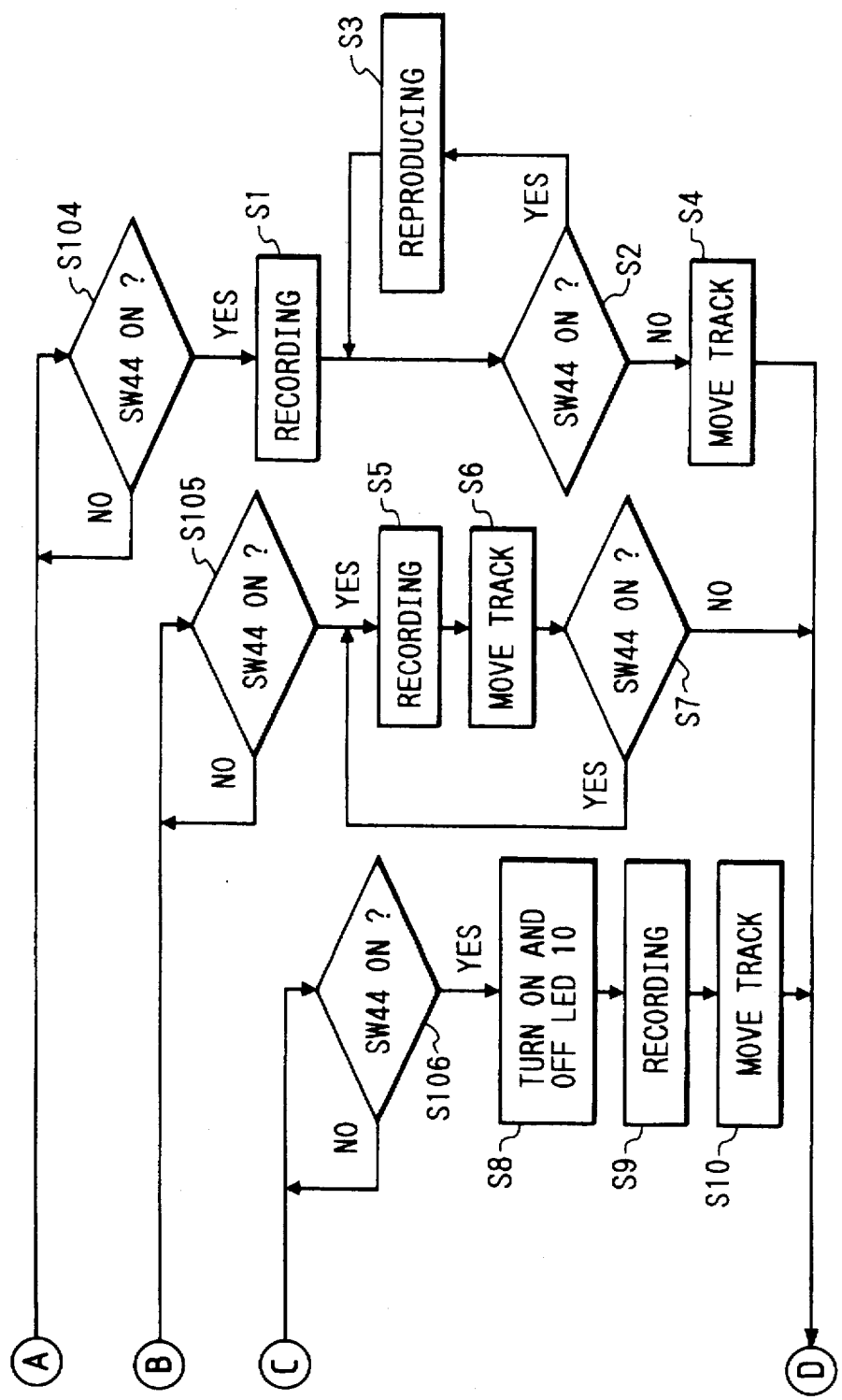

Now reference is made to FIG. 3 for explaining the operations in the recording mode and the display operations related thereto. The recording mode is assumed by the actuation of the recording switch 46, whereupon the display unit 36 displays a symbol "S" 102 indicating the normal phototaking mode (S100) as shown in FIG. 5(1), and also displays a track number by the elements 122. When switch 44 is turned on (S104) in this state, the image is recorded on the magnetic disk 24 as explained above (S1). If the switch 44 remains turned on after recording, the recorded image is reproduced as explained above (S2, S3). In this reproduction, the reproduced video signal, overlapped with the track number of the track recorded in the step S1 is released from the output terminal 34. When the switch 44 is turned off, the magnetic head 28 moves to a next track (S4), and the display unit 36 displays the track number after shifting.

When the mode switch 54 is actuated in this state, the operating mode is shifted from the normal phototaking mode to the continuous phototaking mode (S101), whereupon the display unit 36 displays a symbol "C" 108 indicating the continuous phototaking mode as shown in FIG. 5(2), and also displays a track number for recording, by the elements 122. When the switch 44 is turned on in this state (S105), the obtained images are continuously recorded on the magnetic disk 24 while the switch 44 is turned on (S5, S6, S7).

If the mode switch 54 is actuated again, the operating mode is shifted from the continuous phototaking mode to the self-timer phototaking mode (S101), whereupon the display unit 36 displays a timer symbol 106, indicating the self-timer phototaking mode, as shown in FIG. 5(3), and also displays a track number for recording, by the elements 122. If the switch 44 is turned on in this state (S106), the motor 26 is activated and a light-emitting device for a self-timer (not shown) flashes with a frequency of 8 Hz for 2 seconds (S8). Then recording is executed (S9) and the magnetic head is shifted to a next track (S10).

When the mode switch 54 is actuated again, there is assumed the interval phototaking mode (S103), whereupon the display unit 36 displays a symbol "INT" 104 indicating the interval phototaking mode, as shown in FIG. 6(1), and also displays "$0_m$", indicating that the interval of phototakings is not set, by means of the elements 122 and 120. Then, said interval is set within a range of 1–99 minutes, by means of the up switch 50 and the down switch 52. When the switch 44 is subsequently turned on, the recording and display operations are conducted as explained above, then the magnetic head 28 is shifted to a next recording track, and the display unit 36 flashes the symbol "INT" 104 as shown in FIG. 6(2). Thereafter checked is an interval timer (S11), and the motor 26 is activated 2 seconds before the preset interval. At the same time, the light-emitting device (not shown) for the self-timer flashes at a frequency of 8 Hz for 2 seconds, and the recording (S12) and the track shifting (S13) are conducted. During the interval phototaking mode, the steps S11, S12 and S13 are repeated.

If the date switch 58 is actuated during the flashing state of the "INT" symbol 104 in the interval phototaking mode, the display unit 36 displays the interval of phototaking as shown in FIG. 6(3).

Figure 10:
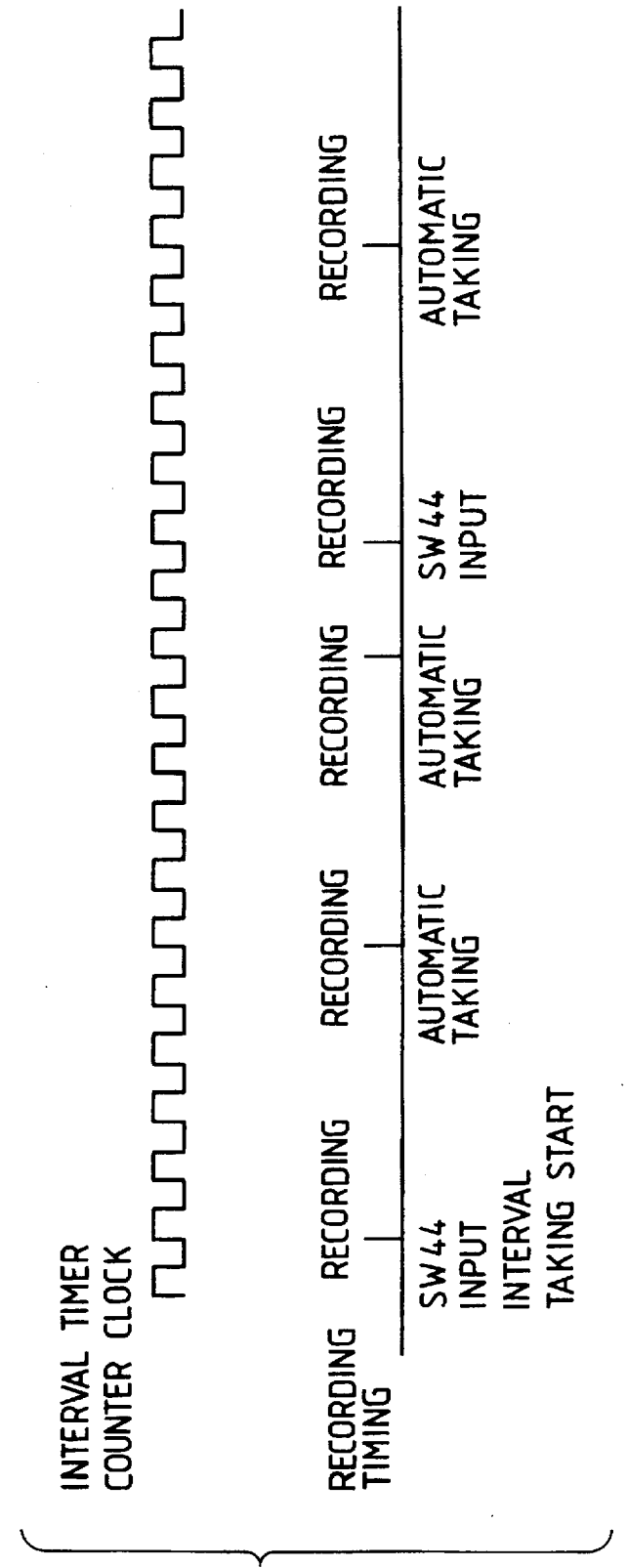
FIG. 10 is a timing chart of an interval phototaking mode.

Also, if the switch 44 is turned on in the course of the interval phototaking mode (S14), the above-explained recording and display are executed (S15, S16), and the measurement of interval time which has been continued up to this point is reset (S17) and is started anew. FIG. 10 is a timing chart in a case when the switch 44 is turned on after two automatic phototaking operations in the interval phototaking mode.

The interval phototaking mode can be cancelled by selecting the normal phototaking mode with the mode switch 54, or by adopting the normal phototaking mode by the actuation of the recording switch 46 after locking or image reproduction, or by adopting the normal phototaking mode by removing and re-loading the magnetic disk. In a case when the switch 44 is turned on while the interval time is not yet determined (display of "$0_M$"), the recording and display are conducted as explained above, and there is assumed the normal phototaking mode, whereupon the symbol "S" 102 is displayed.

In any of the foregoing modes, if the BLC switch 56 is actuated simultaneously with the switch 44, the obtained image is recorded with correction for back lighting. Also, if the flash switch 60 is turned on, the flash emits light at the phototaking operation.

Figure 4A:
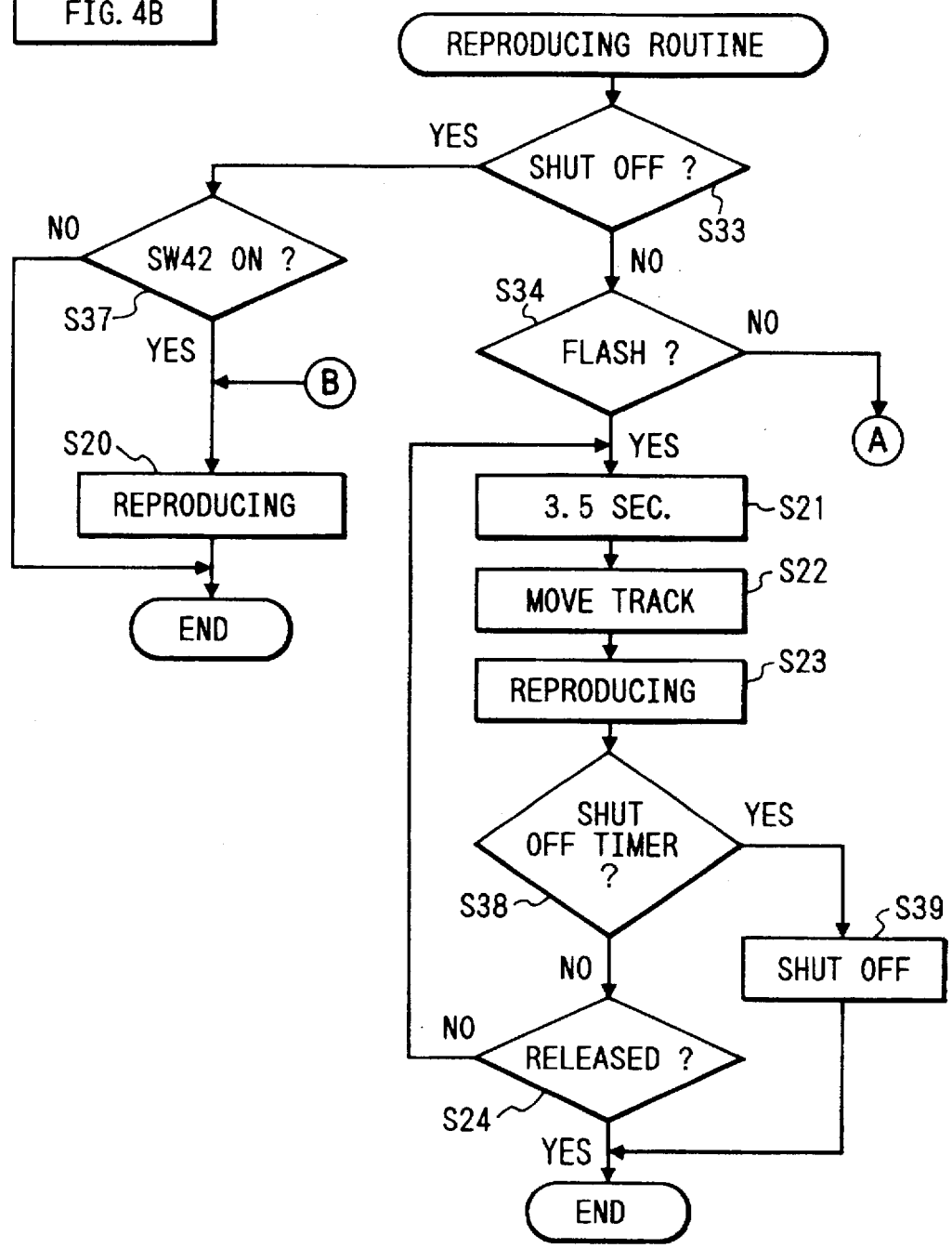
FIG. 4 is a flow chart of an operation sequence for reproduction and erasure.
Figure 4B:
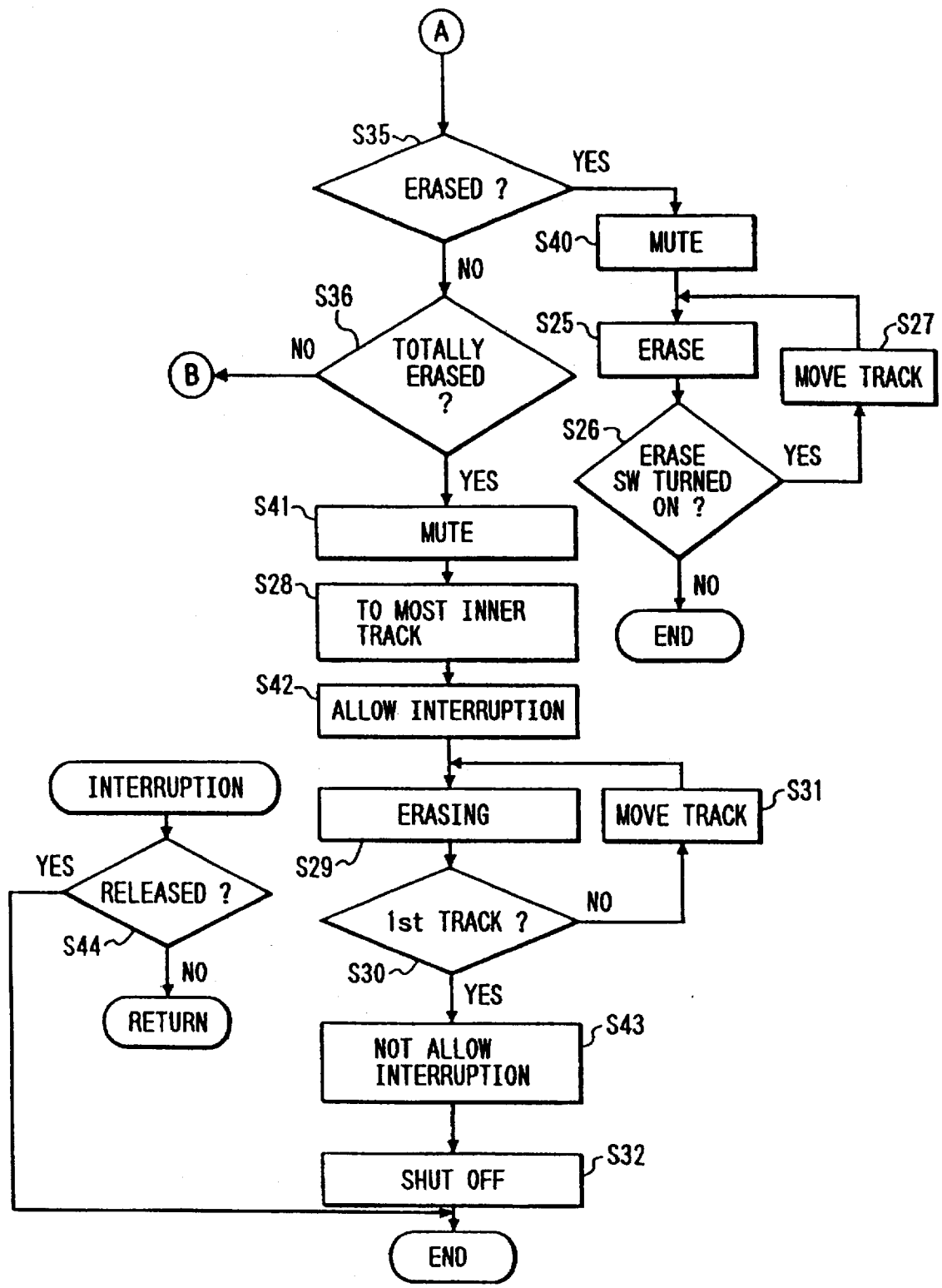

Now reference is made to FIG. 4 for explaining the operations and displays in the reproducing and erasing operations. In response to the actuation of the reproducing switch 48, there is assumed the reproduction mode, in which reproduced is an image which has been recorded immediately before or which was recorded in a designated track (S20). Also, recorded ID data, such as date and time, are released from the output terminal 34 in the form of a character signal, overlapped with the reproduced video signal, in response to the actuation of the date switch 58. Thus, the track number, date and time are displayed and erased cyclically in response to the actuations of the date switch 58. Also, the reproduced track can be varied by the up switch 50 and the down switch 52.

If the track to be reproduced is not recorded, a mute signal is released from the output terminal 34. In such a case, the ID data are not reproduced or displayed. Also the display of ID data does not change by the actuation of the date switch 58.

If the flash switch 60 is actuated during the reproducing operation (S34), there is assumed the interval reproducing mode, whereupon the display unit 36 displays a symbol "INT" 104 indicating the interval reproduction mode, as shown in FIG. 7(2), and also displays the track number in reproduction, by the segments 122. In this mode, after reproduction for 3.5 seconds (S21), the magnetic head is shifted to a next upper recorded track (S22) and said track is reproduced (S23). The steps S21, S22 and S23 are cyclically repeated until the interval reproduction mode. If there are no upper recorded tracks, the recorded tracks are reproduced in succession from the first track. Consequently, if there is only one recorded track, said track alone is reproduced. Also, if there is no recorded track, the display of the "INT" symbol 104 is erased and the interval reproduction mode is cancelled.

The interval reproduction mode can be cancelled either by the actuation of the flash switch 60, or by the turning-on of the switch 42, or by the actuation of the reproduction switch 48 again after locking or shifting to the recording mode, or by the actuation of the mode switch 54.

If none of the switches 42–60 is actuated, in the course of the reproducing modes, including the interval reproducing mode, for a period of 3 minutes (in a case when main power is supplied by a battery) or 6 minutes (in a case when main power is supplied by AC lines) (S38), the power supply is automatically shut off and the reproducing operation is terminated (S39). In the present embodiment, a period of 3 minutes is selected as a time sufficient for reproducing all the tracks on the disk 24. However, such a period is not limiting, and the control circuit 38 may terminate the reproducing operation upon identifying the completion of an interval of reproduction of all the tracks. In the following, such a state is called "shut-off". In this state, the display unit 36 displays the track number by the segments 122 as shown in FIG. 7(1), and the interval reproducing mode is cancelled.

In the shut-off state, the reproduction may be re-started by turning on the switch 42 (S37), or by actuating the reproduction switch 48 again after locking or a shift to the recording mode.

There is not provided an exclusive switch for assuming the erasing mode. The erasing mode is assumed, instead, by simultaneously actuating plural switches used only in the recording mode, in the course of the reproduction mode. More specifically, by simultaneously actuating the switches 42, 44 and the mode switch 54 in the course of a reproduction operation (S35), the reproduced image is muted (S40) and the track under reproduction is erased (S25). If the switches continue to be actuated (S26), the magnetic head 28 is shifted to a next inner track (S27) and said track is erased (S25). During these operations, the display unit 36 provides a display as shown in FIG. 7(3) when the mode switch 54 is actuated, and the muted reproduced image is in succession released from the terminal 34 and displayed on a monitor (not shown).

Also, in the present embodiment, the all-track erasing mode is assumed by the simultaneous actuation of the switches 42, 44, mode switch 54 and BLC switch 56 (S36). Thus, after the reproduced image is muted (S41), the magnetic head 28 is shifted to the innermost 50th track (S28), and the 50th to 1st tracks are erased in succession (S29, S30, S31). After the erasure to the 1st track, the power supply is turned off to enter the shut-off state (S32). After the switches 42, 44, mode switch 54 and BLC switch 56 are once simultaneously actuated, they may be released. The display unit 36 provides a display as shown in FIG. 7(4) when said switches are simultaneously actuated.

The all-track erasing mode can be cancelled by the actuation of the switch 42 (S44) between the steps S42 and S43, or by the actuation of the reproduction switch 48 again after locking or shifting to the recording mode. When the switch 42 is actuated in the course of erasure of a track, the display of the "ALL" symbol 118 is erased to reach a display state shown in FIG. 7(3). It can thus be identified that the all-track erasing mode is cancelled. After the completion of erasure of the track currently under erasure, the display unit 36 provides a display shown in FIG. 7(1), and the muted reproduced image continues to be released from the terminal 34 and displayed on the monitor (not shown). Also, if the switch 42 is actuated during the shift between the tracks, the display unit 36 immediately provides the display shown in FIG. 7(1).

A recording-proof measure may be applied to the magnetic disk 24. If the above-explained erasing operation is conducted in such a case, the display unit 36 provides a display as shown in FIG. 8(1) or (2), and the erasure is not executed.

Also, when the main power supply voltage is reduced to a predetermined value, the battery symbol 114 flashes as a warning signal, and the all-track erasing operation is inhibited at said predetermined voltage. Thus, if the all-track erasing operation is instructed at said predetermined voltage or lower, the display unit 36 provides a display as shown in FIG. 8(3). However, if said predetermined voltage is reached in the course of the all-track erasing operation, the erasure is continued.

When the main power supply voltage is further reduced to another predetermined value, there are inhibited the one-track erasing operation and the continuous erasing operation. In response to an erasing instruction, the display unit 36 provides a display shown in FIG. 8(4).

In the following, there will be explained clock setting for ID data recording. When the date switch 58 is actuated at the actuation of the recording switch 48 (except in the interval recording operation), or at the actuation of the reproducing switch 48 while the magnetic disk 24 is unloaded, the display unit 36 displays a symbol "Y" 110, indicating year, and a corresponding number by the segments 122. By repeated actuations of the date switch 58, the display cyclically changes in the order of year, month, day, hour, minute and normal display. The current date and time can be confirmed in this manner. The displayed number can be varied by the up switch 50 and the down switch 52, and one of the symbols Y, M, D, H and M flashes as shown in FIG. 9(2). The normal phototaking mode is assumed when the above-explained operation is conducted during the display of the interval time (display of a set interval time or an unset state of interval time).

If none of the switches is operated for about 1 minute during the display of date and time, the display is switched to the normal state. Also, the normal display is assumed in response to the voltage drop of the main power supply, actuation of the recording switch 46 or reproducing switch 48, or loading or unloading of the magnetic disk 24.

The present embodiment employs the still video floppy disk as the recording medium, but there may be employed a tape-shaped medium, an optical recording medium, or a solid-state memory such as a semiconductor memory, as the recording medium.

As will be easily understood from the foregoing description, the present embodiment can prevent erroneous execution of the all-track erasing mode, since said mode is executed by simultaneous actuation of plural operation members which are used in the recording mode. Also, the number of operation members, such as switches, can be reduced since such members are used for plural purposes. Also, the use of two display members in the erasing operation allows confirmation that a cancelling operation for the all-record erasing mode is accepted, even if said cancelling operation is conducted in the course of erasure of a track.

Also, the present embodiment can avoid unnecessary electric power consumption, since the power supply is automatically shut off after the erasure of all the tracks.

Furthermore, the present embodiment ensures correct timing for terminating the erasure, as the all-track erasing mode can be cancelled with a simple operation. Also, said cancellation, being achievable with a recording switch, does not require additional switches, thus avoiding an increase in cost.

What is claimed is:

1. A reproducing apparatus for sequentially reproducing a plurality of still image information recorded on a recording medium, said apparatus comprising:

reproducing means for reproducing the still image information recorded on the medium according to one of a plurality of reproducing modes, said reproducing means having (i) an interval reproducing mode for automatically and continuously reproducing the plurality of still image information at an arbitrary time interval and (ii) a normal reproducing mode for reproducing a single still image information;

power supply means for supplying power to said reproducing means;

mode designation means for designating one of the interval reproducing mode and the normal reproducing mode; and control means for controlling said reproducing means and said power supply means according to the reproducing mode designated by said mode designation means, said control means controlling said power supply means so that, when said mode designation means designates the interval reproducing mode, the power supply from said power supply means to said reproducing means continues until reproducing of all of the still image information recorded on the medium according to the interval reproducing mode is completed, and, when said mode designation means designates the normal reproducing mode, the power supply from said power supply means to said reproducing means continues for a predetermined time, during which the still image information recorded on the medium is reproduced according to the normal reproducing mode, and is terminated automatically, upon an elapse of the predetermined time.

2. An apparatus according to claim 1, wherein the medium is of a disc type.

3. An apparatus according to claim 1, further comprising display means for displaying whether said reproducing means is operating according to the interval reproducing mode or the normal reproducing mode.

4. A reproducing apparatus for sequentially reproducing a plurality of still image information recorded on a recording medium, said apparatus comprising:

reproducing means for reproducing the still image information recorded on the recording medium according to one of a plurality of reproducing modes, said reproducing means having (i) an interval reproducing mode for automatically and continuously reproducing the plurality of still image information at an arbitrary interval and (ii) a normal reproducing mode for reproducing a single still image information;

power supply means for supplying power to said reproducing means from a plurality of different types of power sources;

mode designation means for designating one of the interval reproducing mode and the normal reproducing mode; and control means for controlling said reproducing means and said power supply means according to the reproducing mode designated by said mode designation means, said control means controlling said power supply means so that, when said mode designation means designates the interval reproducing mode, the power supply from said power supply means to said reproducing means continues until reproducing of the still image information recorded on the medium according to the interval reproducing mode is completed, and, when said mode designation means designates the normal reproducing mode, the power supply from said power supply means to said reproducing means continues until for a predetermined time, during which the still image information recorded on the medium is reproduced according to the normal reproducing mode, and is terminated automatically, upon an elapse of the predetermined time.

5. An apparatus according to claim 4, wherein said power supply means comprises one of a battery and a conventional power source.

6. An apparatus according to claim 5, wherein said control means controls said power supply means so that, when said mode designation means designates the normal reproducing mode, the time elapsed during which the power supply from said power supply means to said reproducing means for reproducing the still image information recorded on the medium according to the normal reproducing mode is terminated is changed according to whether the power is supplied to said reproducing means from said battery or from said conventional power source.

* * * * *

UNITED STATES PATENT AND TRADEMARK OFFICE
CERTIFICATE OF CORRECTION

PATENT NO. : 5,748,831

DATED : May 5, 1998

INVENTOR(S) : RYOJI KUBO

Page 1 of 2

It is certified that error appears in the above-identified patent and that said Letters Patent is hereby corrected as shown below:

ON THE COVER PAGE

At item [57], ABSTRACT:

line 1, "devices" should read --device--.

IN THE DISCLOSURE

COLUMN 1 line 46, "unvoluntarily" should read --involuntarily--.

COLUMN 6 line 32, "to" should read --of--.

UNITED STATES PATENT AND TRADEMARK OFFICE
CERTIFICATE OF CORRECTION

PATENT NO. : 5,748,831

DATED : May 5, 1998

INVENTOR(S) : RYOJI KUBO

It is certified that error appears in the above-identified patent and that said Letters Patent is hereby corrected as shown below:

<u>COLUMN 8</u> line 57, "until" should be deleted.

Signed and Sealed this

Eighth Day of December, 1998

*Attest:*

BRUCE LEHMAN

*Attesting Officer*     *Commissioner of Patents and Trademarks*